356-400 SR
PM038 XR 3,581,375

June 1, 1971 H. R. ROTTMANN 3,581,375

METHOD AND APPARATUS FOR MANUFACTURING INTEGRATED CIRCUITS

Filed March 7, 1969 11 Sheets-Sheet 1

*INVENTOR.*
HANS R. ROTTMANN

BY Gunter A. Hauptman

ATTORNEY

June 1, 1971 H. R. ROTTMANN 3,581,375

METHOD AND APPARATUS FOR MANUFACTURING INTEGRATED CIRCUITS

Filed March 7, 1969 11 Sheets-Sheet 2

June 1, 1971 H. R. ROTTMANN 3,581,375

METHOD AND APPARATUS FOR MANUFACTURING INTEGRATED CIRCUITS

Filed March 7, 1969 11 Sheets-Sheet 3

METHOD AND APPARATUS FOR MANUFACTURING INTEGRATED CIRCUITS

Filed March 7, 1969 11 Sheets-Sheet 4

METHOD AND APPARATUS FOR MANUFACTURING INTEGRATED CIRCUITS
Filed March 7, 1969 11 Sheets-Sheet 5
FIG. 3 MEASUREMENT & CORRECTION LOGIC 119
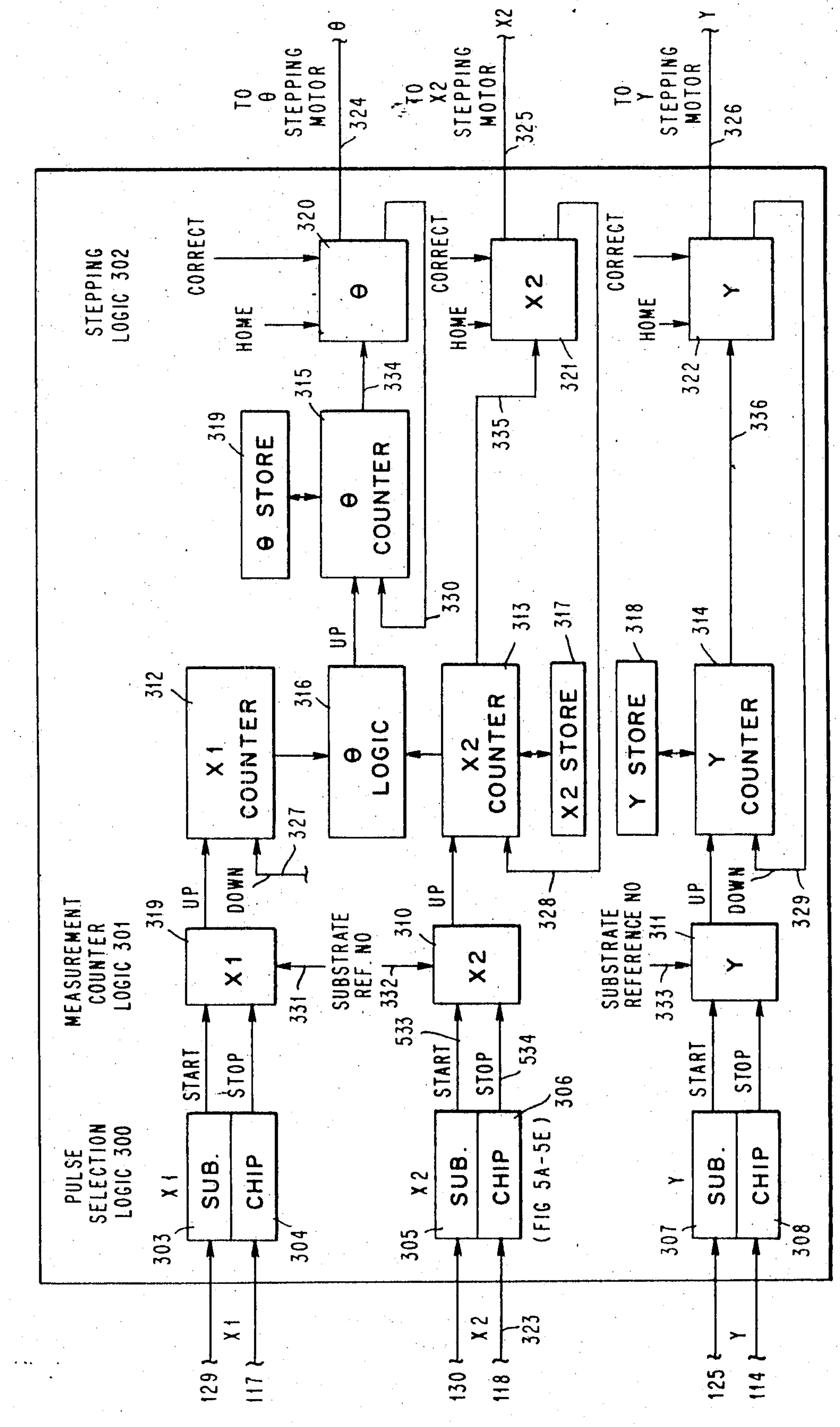

June 1, 1971 H. R. ROTTMANN 3,581,375

METHOD AND APPARATUS FOR MANUFACTURING INTEGRATED CIRCUITS

Filed March 7, 1969 11 Sheets-Sheet 6

PULSE SELECTION LOGIC (CHIP) 306
X2 SCANNING CIRCUIT

PULSE SELECTION LOGIC (CHIP) 306
X2 REFERENCE SIGNAL GENERATION

PULSE SELECTION LOGIC (CHIP) 306
X2 SCAN SIGNAL GENERATION

June 1, 1971 H. R. ROTTMANN 3,581,375

METHOD AND APPARATUS FOR MANUFACTURING INTEGRATED CIRCUITS

Filed March 7, 1969 11 Sheets-Sheet 9

June 1, 1971 H. R. ROTTMANN 3,581,375

METHOD AND APPARATUS FOR MANUFACTURING INTEGRATED CIRCUITS

Filed March 7, 1969 11 Sheets-Sheet 10

United States Patent Office 3,581,375

Patented June 1, 1971

3,581,375

METHOD AND APPARATUS FOR MANUFACTURING INTEGRATED CIRCUITS

Hans R. Rottmann, Poughkeepsie, N.Y., assignor to International Business Machines Corporation, Armonk, N.Y.

Filed Mar. 7, 1969, Ser. No. 805,264
Int. Cl. B23g *17/00;* H05k *13/04, 3/00*
U.S. Cl. 29—407 7 Claims

ABSTRACT OF THE DISCLOSURE

A method and apparatus for accurately positioning solid-state chips, having peripheral conductive pads, in retaining cavities of insulating substrates having corresponding conductive points preparatory to bonding the chips into the substrate and interconnecting the chip pads and substrate points to form "integrated circuits." The chip and a portion of the area surrounding the cavity of the substrate are optically scanned in a number of axes and an electrical output signal representative of the optically scanned points is supplied to logic which selects those electrical pulses which represent the substrate conductive points or terminals and chip pad center lines. Measurement counter logic is operated by the selected pulses to record counts corresponding to the selected scanned points. The recorded counts are used to position stepping motors to properly position the relative positions of the chip and a cavity of the substrate prior to placing the chip in the substrate cavity.

(A) BACKGROUND OF THE INVENTION

(1) Field of the invention

This invention relates to a method and apparatus for determining the relative position of articles and correcting their position in accordance with predetermined criteria, particularly, the invention relates to the placement of small articles such as semiconductor chips in predetermined translational and rotary orientation within the cavities of semiconductor substrates.

Modern day computers have been able to perform more and more operations using smaller and smaller equipment because the size of the components used to build the computers has progressively shrunk. It is now possible to place many small solid-state components into spaces previously occupied by one larger electronic part. For example, even using the relatively recently developed transistor as a comparison, it is now possible to place tens of thousands of solid-state components into the space occupied by an earlier transistor in a standard metal housing. This advance has been made possible by the development of manufacturing techniques for mounting semiconductive "chips" on insulating "substrates." Microscopically-sized chips each containing circuits for performing a number of operations, are interconnected to perform more complicated operations. The chips, typically measuring on the order of 0.05 inch square to 0.150 inch square may each contain twenty to thirty contacts, each contact being 0.002 inch across. A standard technique for interconnecting chips is to place a number of chips, for example four, in cavities formed in an insulating substrate. The substrate is provided with peripheral contacts each corresponding to a contact (called a "pad") of the chip. The chip must be placed in the cavity in such a way that its pads are aligned with the corresponding contacts or terminals of the substrate and then bonded in place. After bonding, the corresponding contact of the substrate must be connected to the corresponding pad of the chip and the substrate is then used as an element of a larger circuit. Commonly, the substrate is "potted" by covering it with an insulating protective material and is connected into a larger circuit by means of contact pins connected to or "forming" its contacts.

A prime problem in solid-state technology is to provide external contacts to extremely small solid state chips. The problem is typically analyzed as comprising four steps: (1) sensing or measuring the position of a chip with reference to a cavity and a substrate, (2) registering the chip relative to the substrate cavity by moving it into alignment therewith, (3) bonding the chip to the substrate in its aligned position, and (4) connecting the contacts or pads on the chip with corresponding contacts (which are normally external pins) on the substrate.

The sensing (or "measuring") operation and the registration (or "alignment") operation can easily be performed by mechanical techniques if the pads on the chip are shaped in the fashion of hemispheres. In such a case, a fixed bracket can contact the chip contacts and, by applying force against the hemispheres placing the chip into a desired position relative to the bracket. However, this technique is not available in the more advanced chips having flat pads in place of the hemispheres. While, even in the case of a hemispheric contact, only the edge of the hemisphere would be contacted, there is always the danger that the physical contact will damage the chip. It is therefore desirable to perform both the sensing and the registration operations without touching any part of the chip. Among the many methods used to determine the position of a chip and to properly register it are several mechanical optical methods; for example, technicians using microscopes have normally performed the operation.

Once the chip is aligned within a cavity of a substrate, it is necessary to bond the chip to the substrate. There are many techniques for performing this; for example, the substrate bottom surface may carry an adhesive which is activated after alignment by properly applied heat. As an alternative, thermal compression bonding may be used, or a slow acting adhesive may be applied to the chip prior to positioning.

Once the chip has been bonded into the cavity of the substrate, the corresponding contacts on the chip and the substrate must be connected. One technique recently used for performing this interconnection is the "decal" method wherein a metal interconnector is carried on a backing sheet which is placed against the contacts, the interconnector adhering to the contacts when the backing sheet is removed. This is a very critical operation which assumes that the chip and substrate contacts are perfectly aligned. Among other techniques for interconnecting the chip and substrate contacts is the so-called "flip-chip" technique wherein the cavity leads are provided at the bottom of the cavity and the chip is placed in the cavity upside down.

Once a chip is connected to the contacts of the substrate, other chips are placed in other cavities of the same substrate and the substrate is then covered with an insulating and protective material and is prepared for use in a larger component.

The invention described herein is directed to improvements in sensing the locations of chips and in the registration of the chips within the cavity of a substrate. The chip sizes are typically 50 mils or greater and must be placed in cavities having dimensions typically 70 mils or greater. There are usually 25 or more pads on each chip having the following pad dimensions of 2 mils. Each substrate has 25 or more contacts surrounding the periphery of each cavity and each contact has 2 mils dimensions. It is necessary that the alignment of each chip pad and its corresponding substrate contact be accurate within a tolerance of about plus or minus 10% (.2 mil) taking into account all significant errors.

(2) Prior art

In the prior art, chip sensing and positioning techniques (without substrate position) have been evolved permitting automated handling with a tolerance of plus or minus 0.2 mil taking into account only the error caused by chip positioning. These techniques constituted a considerable improvement over designs which position the mechanical edges or balls of the chips. In one prior art device a chip is scanned by optical means along three axes to determine its position relative to a preselected standard orientation or reference. The substrate and chip are later combined with a correction applied to the chip alignment to compensate for the deviation from the desired preselected standard orientation. A method and apparatus for sensing and aligning the chip orientation is described in a copending patent application of Brunner and Weber entitled "A Method and Apparatus for Positioning Objects in Preselected Oirentations," Ser. No. 648,814, filed June 26, 1967 and now U.S. Pat. 3,466,514, issued Sept. 9, 1969, assigned to the International Business Machines Corporation which is incorporated herein by this reference. Particular apparatus for conveying and positioning a chip in a substrate cavity utilizing the sensing and alignment means described in the Brunner and Weber application is shown in a copending patent application of the inventor herein, entitled "Apparatus for Positioning Articles on Substrates," Ser. No. 648,704, filed June 26, 1967 and now U.S. Pat. 3,475,805, issued Nov. 4, 1969, and assigned to the International Business Machines Corporation. In this prior art device, a rotary table with a number of positions is provided. At a sensing position, the chip is optically scanned in three axes and electronic apparatus translates the optically scanned information into signals used to operate counters which indicate the misalignment of the chip with reference to a preselected standard orientation along each of the three axes. The contents of the counter are used to position a vacuum probe at a positioning station where the chip is picked up and placed into the cavity so as to exactly compensate for its misalignment within the tolerances of this technique. Since the substrate would have to be aligned by a similar system the following disadvantage is apparent: Two alignment systems are needed with two preselected standard orientation systems. Accordingly, the total alignment accuracy between the chip and its related cavity would be unduly diminished because of the aforementioned tolerance between the two preselected standard orientation systems and the error of the chip positioning system and the errors of the substrate positioning system.

(B) SUMMARY OF THE INVENTION

The method and apparatus of this invention provides a means for positioning chips in cavities of substrates so accurately that the desired registration tolerance between the chip and substrate of plus or minus 0.2 mil is easily achieved. No standard reference is used, a "floating" reference being provided. This is accomplished by sensing the chip position relative to the actual cavity of the substrate rather than relative to an "artificial" standard reference, such as the preselected orientation used in the prior art.

It is therefore an object of this invention to provide an automatic integrated circuit manufacturing system for accurately positioning solid-state chips in retaining cavities of insulating substrates to tolerances never before achieved.

It is another object of this invention to align a plurality of circuit parts with respect to each other in an unusually accurate fashion.

Still another object of this invention is to provide a method for accurately positioning solid-state chips having peripheral conductive pads inside retaining cavities of insulating substrates having corresponding conductive points preparatory to bonding the chips into the substrate and interconnecting the chip pads and substrate points.

Still another object of this invention is to provide a system for scanning points on a chip and a substrate and using the information so obtained to align the chip inside the substrate at a later time.

A further object of this invention is to provide a number of stations including measurement stations and placement stations to permit the measurement of the relative positions of objects at the measurement stations and to use this information when combining the objects, at the placement stations, in a desired relative position.

These objects are achieved by the embodiments to be described herein in accordance with a novel method and apparatus which will be briefly described now. The invention is intended to be used in an automated integrated circuit manufacturing system wherein solidstate chips each having peripheral conductive pads are to be placed in the retaining cavities of insulating substrates each having corresponding conductive points. The chips are intended to be bonded into the substrate prior to interconnecting the chip pads and substrate points. In this invention, the chips and the substrate cavities are scanned in three axes (two X axes and one Y axis). Electrical signals are generated in accordance with the direction of scan and special logic circuitry selects desired ones of these signals indicating information about the scans. The most important information thus obtained represents: for the chip, the beginning or leading edge of a pad and the trailing edge of that pad scanned by the optically scanning system; and for the cavity: the beginning or leading edge of the conducting points or terminal and the trailing edge of that termial of the cavity scanned by its optical system. Assuming that the chip and the substrate cavity have a fixed spacial relationship relative to each other and that the scans are simultaneously performed, taking anyone axis, the selected electrical signals will represent the beginning and the end of the conducting points or terminals of the cavity followed by the beginning of the pad edge and the end of the same pad edge. If a symmetrical chip and cavity are perfectly aligned, the differences between the scans of the cavity terminals and chip pads in all directions will be zero. If the chip pad system is misaligned with reference to the cavity terminal system, that is, it is at some angle with reference to the cavity, the X scans will be different and the Y scans will be different than the X scans. In the invention, counters are provided to store the difference, for each axis, between the cavity terminal center line and pad center line scanned in that axis. When the scanning is completed and the counters have stored information about the scans, the chip and the substrate are moved to a placement station underneath a vacuum probe. The vacuum probe then lifts the chip and holds it over the substrate cavity. At this point the vacuum probe position is adjusted in accordance with the contents of the counters to compensate for the misalignment of the chip with reference to the substrate cavity. The chip is then lowered into the substrate cavity and the chip is subsequently bonded into the cavity.

(C) THE DRAWINGS

FIG. 3 is a block diagram of the measurement and correction logic.

(D) GENERAL DESCRIPTION

Figure 1:
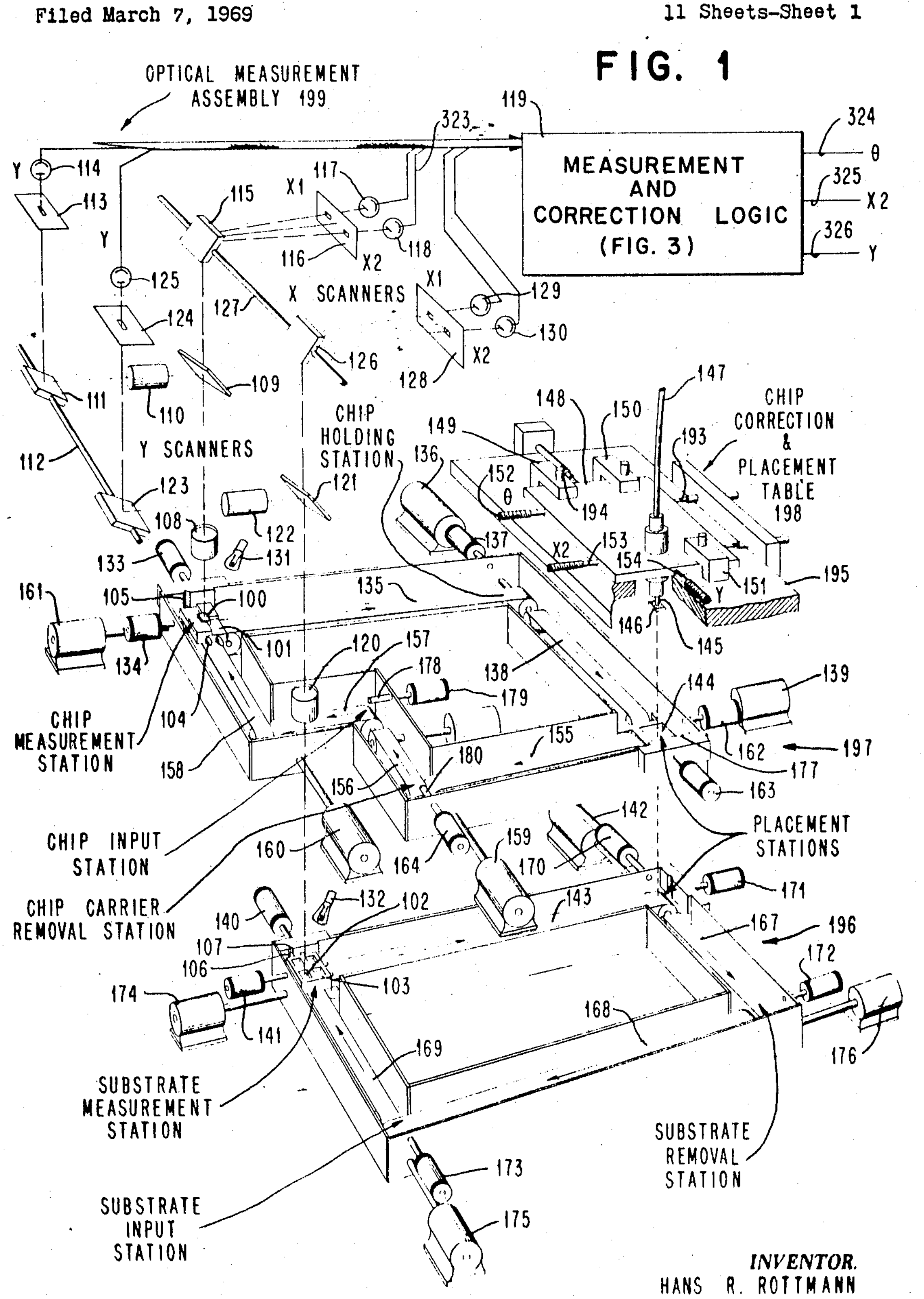
FIG. 1 shows a preferred embodiment of apparatus embodying the invention.

(1) Preferred embodiment (FIG. 1)

The apparatus includes a substrate conveyor system 196, a chip conveyor system 197, a chip correction and placement table 198, an optical measurement assembly 199 and measurement and correction logic 119. The substrate conveyor system 196 and chip conveyor system 197 permit substrates and chips to be carried from station to station as desired. The substrated conveyor system 196 includes a substrate measuring station, a placement station, a substrate removal station and a substrate input station. The chip conveyor system 197 includes a chip measurement station, a chip holding station, a placement station, a chip carrier removal station and a chip input station. Chips 100 held on carriers 101 are initially entered at the chip input station and moved to the chip measurement station where one of three pins 104 holds the carrier in a position fixed by a notch 105. Similarly, a carrier-mounted substrate 103 having a cavity 102 is held at the substrate measruement station by one of its pins 106 in a notch 107 after being placed into the system at the substrate iput station. The conveyor station frictionally moves chips and substrates via motor driven belts. These belts hold the chip and substrate in their respective notches 105 and 107.

The chip 100 at the chip measurement station and the substrate 103 at the substrate measurement station each have a known position in space and thus a known spacial relationship. Ideally, though not shown in FIG. 1, the chip 100 and the cavity 102 are physically in the same plane (the same effect being obtainable by optical compensation). Chips and substrates may be mounted on carriers in a number of ways, only one schematic technique being shown in FIG. 1. Movement of the chip carrier and substrate from station to station may also be accomplished in many ways. In FIG. 1, motion is accomplished by motors and conveyor belts; for example, conveyor belt 135 moves the chip carrier 101 from the chip measurement station to the chip holding station in the direction of the arrow under the power of motor 136. Friction belt drives are not essential to the invention, it being possible to achieve the same end with directly coupled chains and sprockets if a clutching mechanism is provided on the carrier. An alternative scheme would use a rotary table in place of the belts. Since the friction belts shown hold the carriers in notched positions, for example by carrier 101 being held in the position fixed by one of pins 104 and the notch 105, it is desirable to provide a solenoid 133 for retracting the notch and a solenoid 134 for removing the carrier from the belt 158 normally holding it in position and onto the next belt 135 for moving it to the chip holding station. Similarly, the substrate 103 held in position by pin 106 and notch 107 is transferred to the next belt 143 by a retracting action of solenoid 140 and a pushing action of solenoid 141. Known solenoid actions are provided at each station to permit movement at desired intervals of the carriers around the conveyors.

The optical measurement assembly 199 permits optical scanning of the chip 100 and the substrate cavity 102 while they are at their respective chip measurement and substrate measurement stations. Subsequently, the chip carrier 101 is moved to a chip holding station while a new chip is brought into the chip measurement station for optical scanning. At this time another one of the four cavities of the substrate in the substrate measuring station is scanned. In this way four different chips are scanned at the chip measurement station while four different cavities of a single substrate are scanned at the substrate measurement station. The chips on their carriers are accumulated one at a time at the chip holding station. It should be apparent that it is not necessary to have four cavities on each substrate, this number being chosen merely for example. When four chips and their corresponding four cavities have been optically scanned, the substrate 103 is removed from the substrate measurement station and brought to the placement station of the substrate conveyor system 196 at the same time that a chip carrier is brought to the placement station of the chip conveyor system 197. A chip correction and placement table 198 removes the first chip 100 from its carrier 101 (which is then moved to the chip carrier removal station) and lowers the chip into the substrate cavity 102 at the placement station. This is repeated three more times until each of four chips is placed into each of four cavities of the substrate 103, after which the substrate 103 is moved to the substrate removal station. The amount of correction performed during the placement of chips in the substrate cavities by the chip correction and placement table 198 is determined by signals derived by the measurement and correction logic 119 from the optical scanning performed by the optical measurement assembly 199 at the time that the corresponding chip and cavity were scanned at their respective chip and substrate measurement stations.

The optical measurement assembly 199 supplies inputs to measurement and correction logic 119 for controlling the chip correction and placement table 198. The chip 100 held on the carrier 101 at the chip measurement station is illuminated from all directions by light illustrated symbolically by bulb 131. A lens 108 projects an image of the chip via a beam splitter 109 which causes the image to pass through a 90 degree rotating prism system 110 (commonly known as Pechan prism) and directing the image onto a rotating mirror 111 (or equivalents such as refractions through rotating glass blocks, vibrating slits placed in the image plane, etc.) mounted on a shaft 112. Rotation of the mirror 111 causes the image of chip 100 to be scanned in the Y axis across an aperture in a mask 113. A photocell 114 monitors the light intensity appearing through the aperture in the mask 113. Another image of the chip 100 passes through the beam splitter 109 and is reflected from a rotating mirror 115 mounted on a shaft 127 scanning the chip 100 images in the X direction across a mask 116 having two apertures defining two X-axes scans X1 and X2 monitored by photocells 117 and 118.

The substrate cavity chosen for scanning is similarly scanned by the optical measurement assembly 199. A lens 120 focuses an image of the cavity 107 through a beam splitter 121 causing the image to travel through a beam rotator 122 to a Y scanning mirror 123 mounted on the same shaft as the chip scanning mirror 111. An aperture 124 defines a Y-axis scan which is monitored by a photocell 125. Another image of the cavity 102 passes through the beam splitter 121 and is scanned by mirror 126 mounted on shaft 127 onto a mask 128 having two apertures defining two X-axes scans X1 and X2 monitored by photocells 129 and 130. It will be evident that different cavities of the substrate 103 can be scanned by "moving" the relative position of the optical measurement assembly 119 and the substrate 103 or by moving the masks 113, 116, 124 and 128. Many means for achieving this will be evident; for example, each mask may be provided with multiple apertures (and corresponding photocells if light pipes are not used) selectable as desired during operation.

The phototubes 114, 117, 118, 125, 129 and 130 translate optical signals into electrical signals. It is not necessary to identify the particular phototubes used because they are known to those skilled in the art as phototubes, photocells, optical sensors, photo multipliers, etc. The electrical signals from the phototubes are utilized by the measurement and correction logic 119 to generate electrical pulses defining the position of the chip 100 with respect to the actual position of the cavity 102 of the substrate 103. The misalignment, if any, is expressed in terms of an X coordinate X2, a Y coordinate Y and a rotational angle $\theta$ in accordance with principles described in the cross-referenced Brunner and Weber application. The signals X2, Y and $\theta$ from the measurement and correction logic 119 are supplied to corresponding X2, Y and $\theta$ motor drives, not shown, connected to the chip correction and placement table 198.

When substrate 103 has been moved to the placement station of the conveyor system 196 and chip carrier 101 with chip 100 has been moved to the chip holding station of the conveyor system 197, the chip correction and placement table 198 places the chip in the cavity 102 of the substrate 103. The chip correction and placement table 198 includes a vacuum probe 145 for holding a chip (for example another chip 146) by a vacuum maintained in the probe through a hose 147 connected to an appropriate vacuum pump, not shown. The probe 145 is held in a plate 148 slidably held by pressure clamps 149, 150 and 151 against the table 195. The plate 148 is movable along three axes $\theta$, X2 and Y under the control of screws $\theta$ 152, X2 153 and Y 154 driven by stepping motors (not shown) in accordance with corresponding electrical signals $\theta$, X2 and Y on lines 324, 325 and 326 from the measurement and correction logic 119.

The operation steps are: (1) The chip correction and placement table 198 removes a chip (for example 146) from its carrier and holds it above the carrier while the carrier is moved from the placement station of the conveyor system 197 to the chip carrier removal station. (2) When an aperture 144 is exposed, the screws 152, 153 and 154 are adjusted to move the probe 145 in a position compensating for the misalignment detected by the optical measurement assembly 199. (3) The probe 145 lowers the chip 146 into the appropriate cavity of the substrate and prebonds it. (4) The probe 145 is withdrawn and the chip 146 is left in the cavity. (5) The substrate is moved to the substrate removal station for the next step (bonding) in the operation.

(2) Alternative embodiments (FIGS. 2A–2D)

Figure 2A:
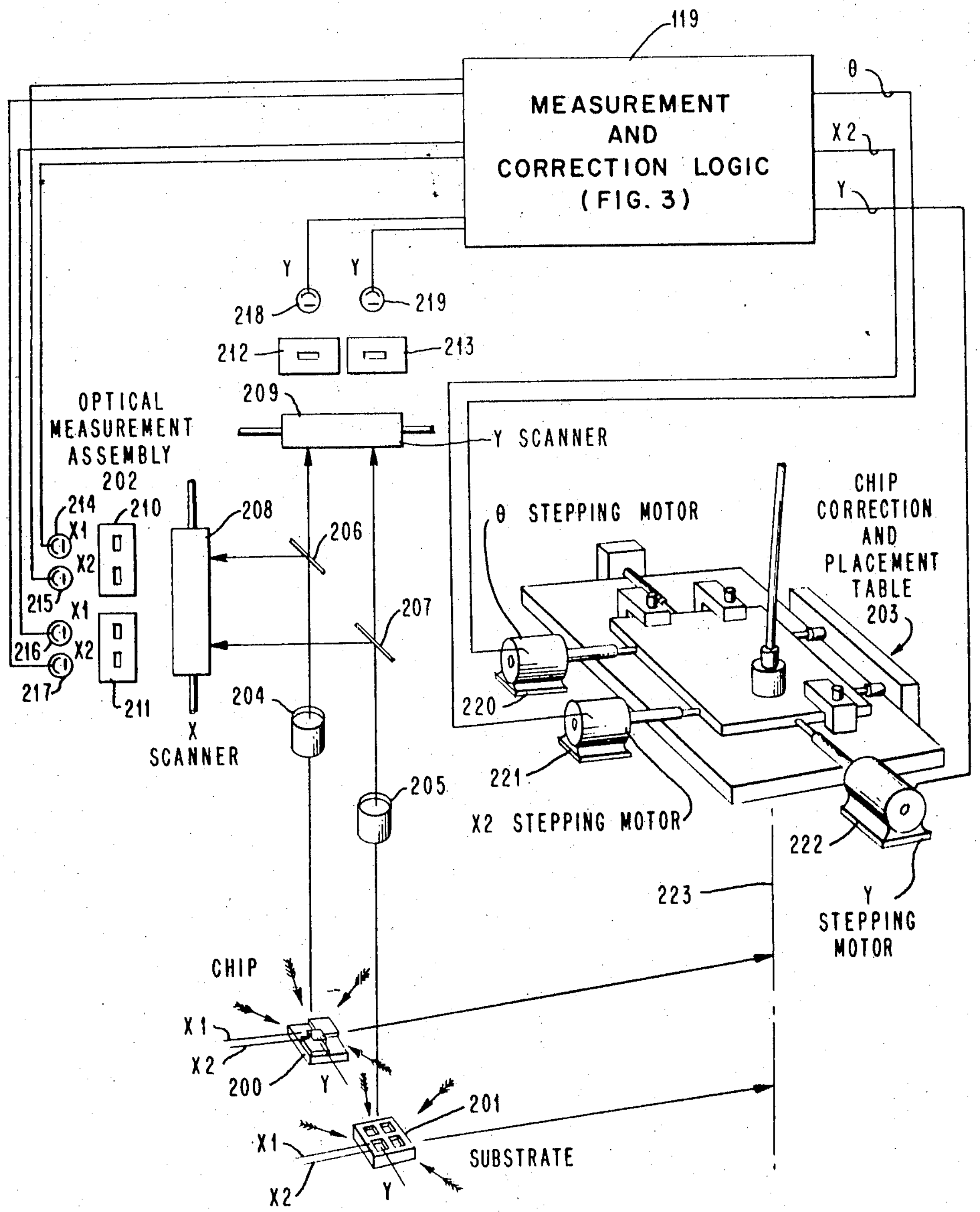
FIG. 2A shows an alternative embodiment of the invention wherein a different optical measurement assembly is shown.

Referring now to FIG. 2A, a different embodiment of the optical measurement assembly 202 is shown together with a more detailed schematic illustration of the scanning. This embodiment utilizes a chip correction and placement table 203 operated in accordance with electrical signals received from the same measurement and correction logic 119 previously shown in FIG. 1. The conveyor system of FIG. 1 may also be used, or an appropriate substitute may be provided (such as an X–Y table supporting both a substrate at the measurement station and a substrate at the placement station), to position chip 200 and substrate 201 in fixed positions with respect to the optical measurement assembly 202. The optical measurement assembly 202 substantially simultaneously scans the chip 200 and the substrate 201 each along two X axes X1 and X2 and a Y axis Y as shown in FIG. 2A. The chip 200 and the substrate 201 are illuminated from the directions generally shown by the arrows. Images of the chip 200 and one substrate cavity on the substrate 201 at a time are focused by lenses 204 and 205 through beam splitters 206 and 207 causing each of the images to be reflected from both an X scanning mirror 208 and a Y scanning mirror 209 (which may be quadrugonal). The 90 degree rotation required in the embodiment of FIG. 1 is not needed in this embodiment because the mirrors 208 and 209 are mounted at 90 degrees to each other. Also a single (quadrugonal if desired) mirror is mounted on each shaft rather than two mirrors. In a similar manner as the embodiment explained with reference to FIG. 1, masks 210, 211, 212 and 213 scan images of the chip 200 and substrate cavity to supply light to the photocells 214 through 219. When the chip and substrate are moved to a placement station, generally shown by the line 223, under the chip correction and placement table 205, the measurement and correction logic 119 supplies signals on lines $\theta$, X2 and Y to stepping motors 220, 221 and 222. These motors supply the corrective motions aligning the chip 200 in a selected cavity of the substrate 201 to compensate for the misalignment measured by the optical measurement assembly 202.

Figure 2B:
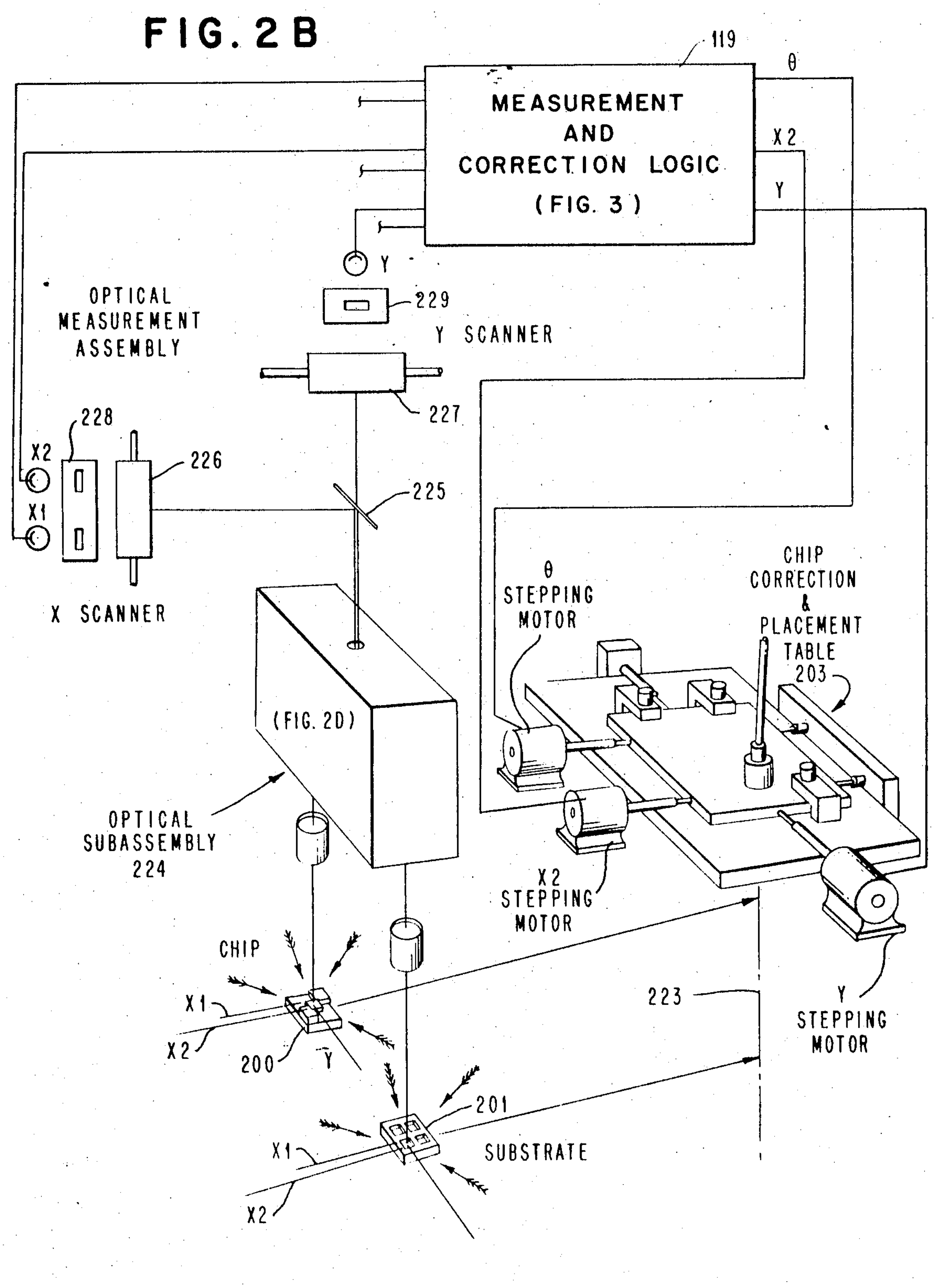
FIG. 2B shows a second alternative embodiment of the invention showing an optical measurement assembly including an optical subassembly shown in more detail in FIG. 2D.

Referring now to FIG. 2B, it is possible to reduce the size of the optical measurement assembly by providing a separate optical subassembly 224 which superimposes the chip and substrate cavity images upon each other, thus eliminating the need for separate mirrors and apertures and photocells for both the chip and the substrate. The chip 200 and the selected cavity of the substrate 201 are illuminated as previously described, it being desirable, in this case, to alternate illumination to prevent possible errors due to the superimposed scanning: (however, it is not essential that alternate illumination be provided). The optical subassembly 224, shown in more detail in FIG. 2D, focuses images of both the chip 200 and a cavity of the substrate 201 through the beam splitter 225 which provides separate images reflected from the rotating scanning mirrors 226 and 227 which are presented to photocells through apertures on the masks 228 and 229 in the manner previously described. The measurement and correction logic 119 operates to supply electrical signals on wires to the $\theta$ stepping motor, X2 stepping motor and Y stepping motor to cause the chip correction and placement table 203 to properly position the chip 200 in a selected cavity of the substrate 201 when the chip and substrate are brought into position along the line 223. The measurement and correction logic 119 should, desirably, be provided with signals at alternate inputs in accordance with the alternate illumination of the chip 200 and substrate 201. This alternating input can be provided by logic circuitry or by simple mechanical switching that has not been shown because it is within the skill of the art. It is not necessary to provide alternating inputs to the measurement and correction logic 119 if this logic is simplified to eliminate the extra inputs.

Figures 2C, 2D:
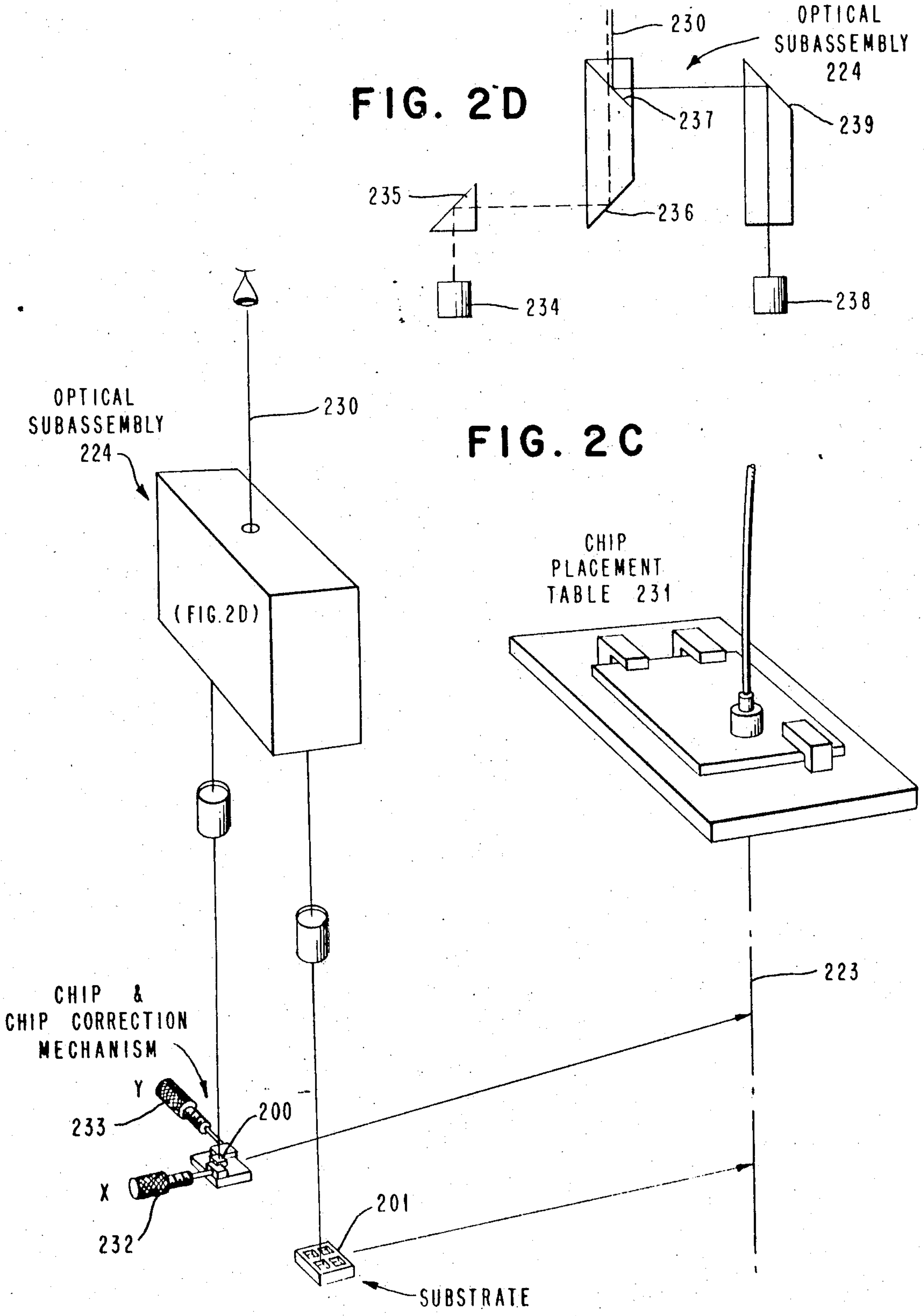
FIG. 2C shows a third alternative embodiment showing a manual method for using the invention illustrated by the use of the optical subassembly shown in more detail in FIG. 2D.
FIG. 2D illustrates the optical subassembly in schematic form.

Referring now to FIG. 2C, the chip 200 and substrate 201 may be manually aligned by vernier adjustments schematically shown by verniers 232 and 233 in accordance with the degree of alignment indicated by examining the light along line 230 through an appropriate eye piece (not shown). Thus, when the chip 200 and substrate 201 are brought to the placement station along the line 223, a fixed chip placement table 231 may be used without any corrections being applied at the time of placement.

Referring now to FIG. 2D, the optical subassembly 224 is shown schematically. Light from a chip is focused by lens 234 on prism 235 to direct it to a trapezoidal prism having a reflecting surface 236 and a partially transparent surface 237. The image from the substrate is focused by lens 238 on another prism having a reflecting surface 239 directing the image onto a reflecting side of surface 237 of the trapezoidal prism. Thus the images of the chip and the substrate are superimposed on line of sight 230.

(E) DETAILED DESCRIPTION OF PREFERRED EMBODIMENT

(1) Conveyor and stations (FIG. 1)

The conveyor is divided into two major sections, a substrate conveyor system 196 and a chip conveyor system 197. The substrate conveyor system 196 has the following stations: a measurement station, a placement station, a removal sttaion and an input station. The chip conveyor system 197 has the following stations: a measurement station, a holding station, a placement station, a removal station and an input station. At each input station carriers holding substrates and chips are entered into the appropriate conveyor system. The respective chips and substrates are optically scanned at the measurement stations, and at the placement stations, the chips are placed into the corresponding cavities of the substrate. The substrate and chip carriers are removed at the carrier removal stations. In the case of the chip conveyor system 197, there are also provided a chip holding station. The function of the chip holding station is to accumulate a plurality of chips while the cavities of the current substrate are being scanned at the substrate measurement station. Thus, for example, if a substrate has four cavities, four chips will accumulate at the chip holding station before the substrate and the first chip are brought to the placement stations.

Movement of carriers from station to station is performed by a series of moving friction belts. Belts 135, 138, 155, 156, 157 and 158 transfer chip carriers in the chip conveyor system 197. Similarly, belts 143, 167, 168 and 169 carry the substrates in the substrate conveyor system 196. The belts are rotated by motors 136, 139, 159, 160 and 161 of the chip conveyor system 197 and motors 142, 174, 175 and 176 of the substrate conveyor system. As an example, motor 136 rotates in a clockwise direction (viewed from the end of the shaft) to move the belt 135 in the direction of the arrow shown on that belt. When chip carriers and substrates move on their respective belts, their direction of motion is restrained by walls (unnumbered) shown in the case of both the chip conveyor system 197 and the substrate conveyor system 196.

Movement of carriers and the substrates from station to station is controlled by a number of interacting solenoids. In the case of the chip conveyor system 197, chips entered at the chip input station initially move to the chip measurement station via belts 157 and 158 where one of the points 104 on the carrier 101 enters the notch 105 and is held in that position by frictional engagement with the moving belt 158. When it is desired to release the chip carrier 101, solenoid 133 is operated to withdraw the notch 105 and solenoid 134 pushes the chip carrier 101 onto the belt 135 which carries it to the chip holding station. Since no operations are performed at the chip holding station, it is not necessary to provide a notching means, but it is only necessary to permit accumulation of chip carriers against a wall of the chip conveyor system 197. When it is desired to remove a chip carrier from the chip holding station, solenoid 137 pushes that carrier onto the belt 138 causing it to be moved over the aperture 144 and held in accurate alignment by one of its pins 104 in the notch 177. Removal of a chip carrier from the placement station of the chip conveyor system 197 is accomplished by withdrawing the notch 177 due to activation of the solenoid 163 and a pushing action of the solenoid 162, causing the carrier to move on belt 155 until it meets the shaft 180 of solenoid 164. The carrier will remain against the shaft 180 until it is removed at the carrier removal station, or, if desired, until the shaft 180 is withdrawn by activation of solenoid 164, to permit the carrier to move the chip input station. Again, the carrier will be held against the shaft 178 of solenoid 179 due to frictional engagement with the moving belt 156. The new chip may thus be placed upon the carrier and then the solenoid 179 may cause the shaft 178 to withdraw so that the carrier with a new chip moves via belts 157 and 158 to the chip measurement station.

The operation of the substrate conveyor system 196 is similar. The substrates (or substrates and carriers) are moved by means of belts 143, 167, 168 and 169 driven by motors 142, 174, 175 and 176, respectively. The substrates, entered at the substrate input station, move on belt 169 to the substrate measurement station where they are held by engagement of one of the pins 106 in the notch 107. The substrate is released by withdrawing the notch 107 (due to activation of solenoid 140) and a pushing action of solenoid 141, causing the substrate to move on belt 143 into engagement at the placement station. Removal of the substrate at the placement station is similarly accomplished by withdrawal of solenoid 171 and a pushing action of solenoid 170, placing the substrate on belt 167 where it moves to the substrate removal station. If it is not desired to remove the substrate at the substrate removal station, solenoid 172 pushes the substrate onto the belt 168 so that it moves to the substrate input station where a new substrate may be placed on the carrier. When it is desired to move a substrate from the substrate input station to the substrate measurement station, solenoid 173 is activated to push the substrate onto belt 169.

(2) Optical measurement assembly (FIG. 1)

The optical measurement assembly 199 includes two shafts 112 and 127 synchronously rotated by motors, not shown, and carrying mirrors 111, 115, 123 and 126. The mirrors are shown as having two reflecting surfaces, one on each side, but can in the alternative comprise more reflective or refractive surfaces if this is desired. The object of the optical measurement assembly 199 is to scan images across apertures of masks 113, 116, 124 and 128 so as to present to photocells 114, 117, 118, 125, 129 and 130 successive points along three scanned axes X1, X2 and Y. The direction of scan is determined by the lens and mirror system and the width of the scan is determined by the size of the apertures. For instance, a typical size for the apertures would be 2 to 8 mils by 40 to 80 mils. The spinning mirrors 111, 115, 123 and 126 present different points of an image impressed upon them across the apertures. Images are placed on the rotating mirrors by means of lenses 108 and 120 and rotating lenses 110 and 122. Multiple scan directions are obtained by beam splitters 109 and 121.

Light is directed upon chip 100 and cavity 102 to permit sufficient brightness for illuminating all points sensed by the photocells. The lenses 108 and 120 focus the lighted image on beam splitters 109 and 121. Identical images travel from the beam splitters 109 and 121 to their respective prisms 110 and 122 and X mirrors 115 and 126. The prisms 110 and 122 rotate the image 90 degrees so that the Y mirrors 111 and 123 scan the same image as the X mirrors 115 and 126 but at a 90 degree angle of scan. The images scanned by mirrors 111 and 123 are examined across one axis only by the single aperture of each of the masks 113 and 124. The images scanned upon the masks 116 and 128 by the mirrors 115 and 126, however, are examined along two axes X1 and X2 by the two apertures of each of the masks 116 and 128.

Normally, the optical measurement assembly 199 scans each chip four times to permit a more accurate reading. For this reason, four sided scanning mirrors would be appropriate since only one complete revolution of the shafts 112 and 127 would be necessary for each scanning operation as opposed to the two complete rotations necessary to obtain four scans with the system shown in FIG. 1.

(3) Chip correction and placement table (FIG. 1)

The chip correction and placement table 198 is shown in detail in the cross-referenced Brunner and Weber application and need only be briefly described here. A fixed table 195 has attached to it brackets 149, 150 and 151 each having a spring loaded frictional holding member, for example 194, for holding the plate 148 in frictional engagement with the table 195. The plate 148 may be moved in three coordinates by driven screws 152, 153 and 154. The screws are moved by motors, not shown, against spring loaded shafts, for example, 193, slidably mounted in tubes. The plate 148 carries a probe 145 connected to a source of vacuum, not shown, by tube 147.

(4) Measurement and correction logic (FIG. 3)

The purpose of the measurement and correction logic 119 is to take the electrical signals coming from the photocells 114, 117, 118, 125, 129 and 130 and select the significant pulses for operation of stepping motors $\theta$, X2 and Y. Signals from the photocells enter pulse selection logic 300 for each axis scanned on both the substrate and the chip. For example, signals corresponding to the X1 scan of the substrate enter pulse selection logic 303 while information regarding scanning of the chip along axis X1 is entered into pulse selection logic 304. The pulse selection logic recognizes those signals which correspond to the edge condition points or terminals of a cavity and to the edges of a corresponding chip pad along each axis. Along the X2 axis, as an example, the edges of a cavity terminal cause a counter 313 to start counting and the center line falling between the edges of the chip pad cause the same counter to stop counting. Thus the counter 313 should contain a count equivalent to the distance between the cavity terminal center lines and the pad center line as will be explained with reference to the overall operation shown in FIGS. 4A and 4B. The pulse selection logic 300 consists of a number of selection circuits identical in operation and therefore it will be necessary only to show the details of one of the circuits, the chip scanning circuit for axis X2 to be explained with reference to FIGS. 5A through 5E.

Measurement counter logic 301 controls the operation of counters 312, 313 and 314 in accordance with the corresponding pulse selection logic 300. Substrate reference numbers may be supplied to the measurement counter logic via lines 331, 332 and 333 to preset the corresponding counters in accordance with the particular cavity currently being examined.

A $\theta$ counter 315 is stepped in accordance with information from both the X1 counter 312 and the X2 counter 313. It is necessary to provide stores 317, 318 and 319 in order to store the quantities in the connected counters because four chips may be measured before a substrate is brought into position for alignment with four corresponding chips. The counters are stepped down by appropriate signals on lines 327, 328, 329 and 330 causing stepping logic 302 to control stepping motors which are moved from a "home" position to a "correct" position in order to place each chip in its correct alignment with a substrate cavity.

Figure 4A:
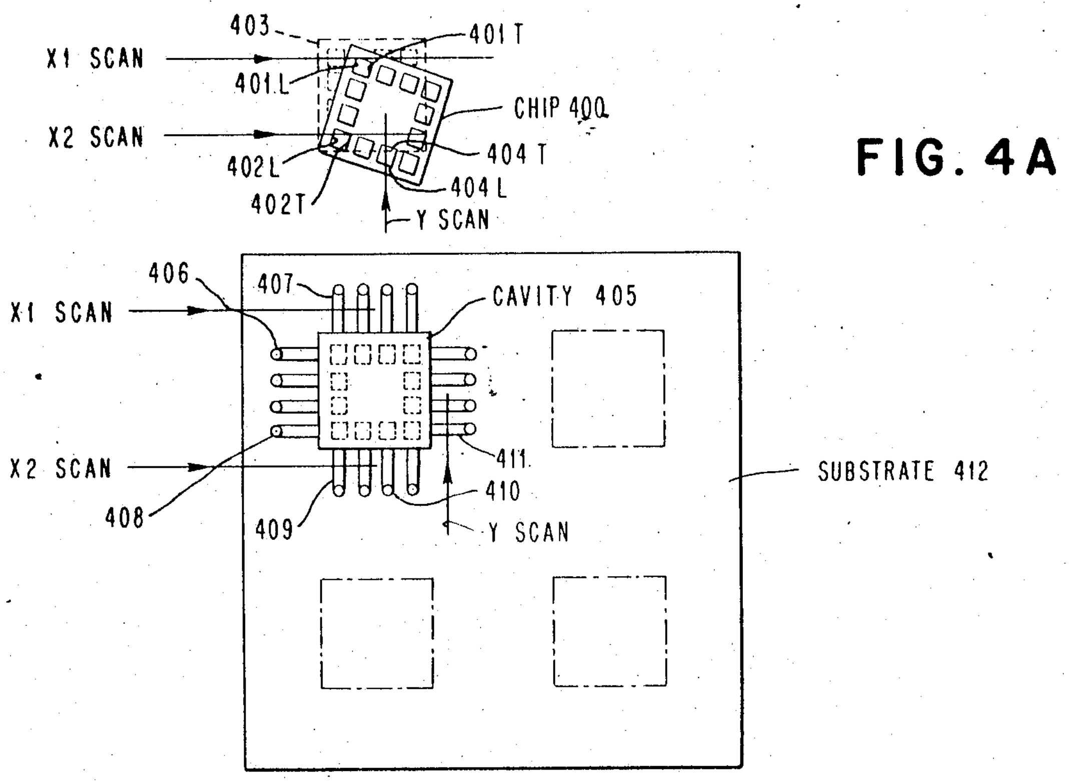
FIGS. 4A and 4B are, respectively, a schematic and waveform diagram illustrating the overall operation of the measurement and correction logic of FIG. 3.
Figure 4B:
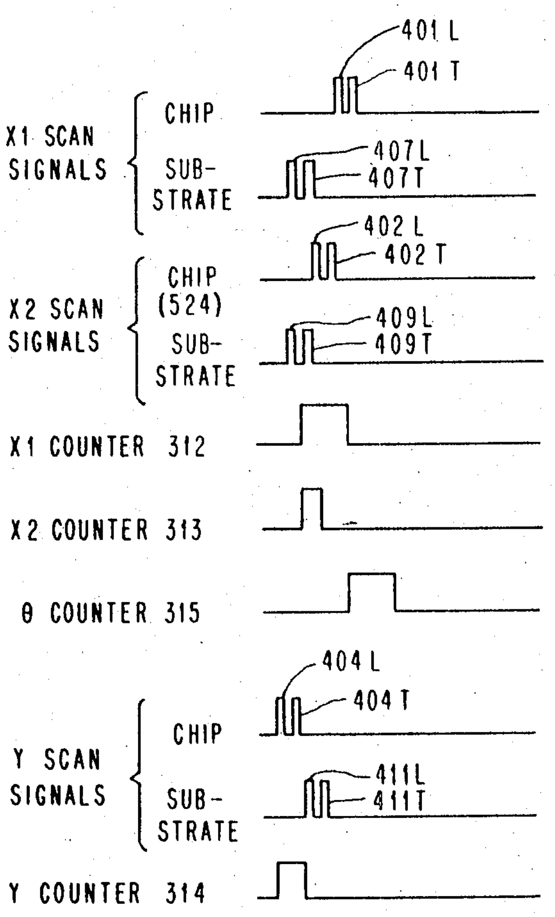

(a) Overall operation (FIGS. 4A–4B)

The overall operation of the measurement and correction logic 119 will become evident from an examination of FIGS. 4A and 4B showing a chip 400 misaligned with reference to a cavity 405 on a substrate 412. The waveform diagrams of FIG. 4B are generated in accordance with optical scanning of the chip 400 and substrate 412 shown in FIG. 4A and thus correspond to the physical portions of the chip and substrate shown. The chip 400 is shown misaligned from its normal position 403. It includes a number of pads of which pads 401, 402 and 404 are typical. The optical system scans along three axes X1, X2 and Y. The X1 scan passes (extending 40 to 80 mils from the center line shown) over the pad 401 hitting the leading edge 401L and subsequently the trailing edge 401T. The pad 402 is similarly scanned along a path X2 and the pad 404 along a path Y. The substrate 412, having several cavities of which cavity 405 is an example, contains conductive points or terminals shown by, for example, pins 406, 408 and 410. The X1, X2 and Y scans pass over the terminals of the cavity points indicated by, respectively, 407, 409 and 411. The measurement and correction logic 119 converts the optical scanning information into electrical signals which operate counters by amounts equal to the distances along the scanned axes between the cavity terminals along an axis and the center line of a scanned pad on that axis. Obviously, these distances will be equal if the chip 400 is in the position 403, and will be offset by a geometrically determinable amount in accordance with the degree of misalignment of chip 400. It is not necessary to explain the underlying principles necessary to calculate the misalignment in view of the cross-referenced Brunner and Weber application wherein such explanation will be found in detail. It suffices to say that the X2 and Y quantities may directly drive a stepping motor for correction and that a third stepping motor $\theta$ may be driven by signals derived in accordance with the equation:

$$\theta = X2 + K(X2 - X1)$$

where K is a dimensional constant determined by the particular parameters of the physical embodiment as explained in the cross-referenced Brunner and Weber application.

Reference to FIG. 4B shows that X1 counter 312 is started by a signal corresponding to the edge 407 of the substrate cavity 405 scanned along the X1 axis and stopped by the average time of the pulses corresponding to the leading edge 401L of the pad 401 and the trailing edge 401T of the pad 401, corresponding to the center line of the pad. Similarly X2 counter 313 is started by a signal (on line 524, to be explained later with reference to FIG. 5C) corresponding to the substrate cavity edge 409 and stopped at approximately the center line of the pad 402. The Y counter 314 is, due to the position of the chip 400 as shown in FIG. 4A, started by the center line of the chip pad 404 and stopped by the later detected substrate cavity edge 411. The $\theta$ counter 315 is set to record a quantity determined by the contents of the X2 counter 313 and X1 counter 312 in accordance with the above equation. (It is obvious that it is not necessary to provide an X1 counter and that the $\theta$ counter can be directly operated.) As will be explained, it only remains to use the contents of the X2 counter 313, $\theta$ counter 315 and Y counter 314 to operate drive motors on the chip correction and placement table 198 in order to adjust the chip 400 to compensate for the misalignment shown in FIG. 4A.

(b) Pulse selection logic (FIGS. 5A–5E)

The pulse selection logic converts signals representative of light patterns from the scanning operation into electrical signals used to start and stop counters corresponding to the scanned axes. The pulse selection logic is divided into a number of sections. These sections are essentially identical for each photocell and it is therefore only necessary to describe the pulse selection logic for the photocell 118 received on line 323.

Figure 5A:
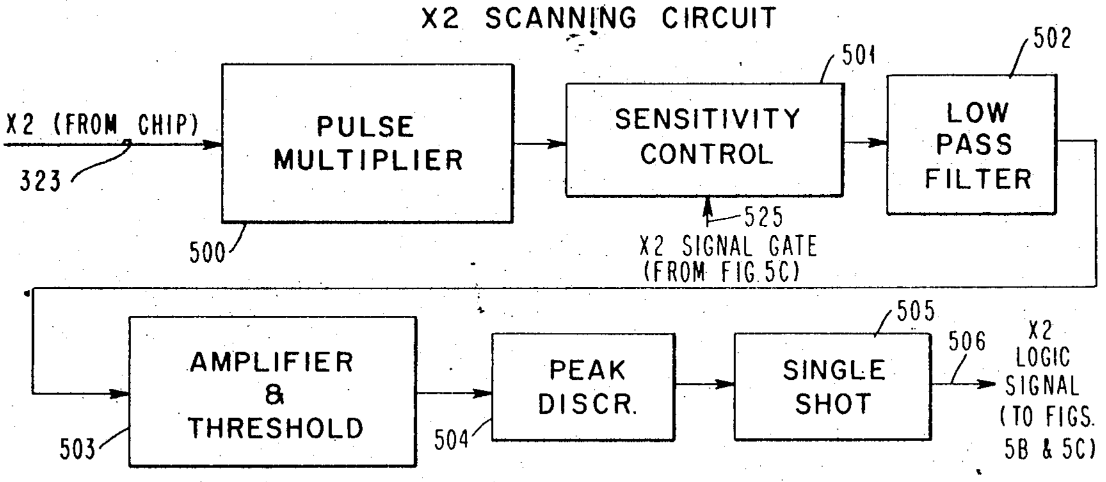
FIGS. 5A through 5E are logic and waveform diagrams illustrating the pulse selection logic.

Referring first to FIG. 5A, the scanning circuit for the pulse selection logic of the chip 306 is shown. The pulse multiplier 500 receives signals representatives of light scanned across photocell 118 in the X2 axis. Scanning along this axis results in several indications in addition to the desired pad edges. For example, there may be foreign matter giving rise to noise pulses and there may be unusual contours over which the light passes which may also cause noise signals. The purpose of the scanning circuit is to isolate the desired pad edge signals from the background noise. As will be explained later with reference to FIG. 5C, it is possible to predict the approximate time during which desired signals are received by the pulse multiplier 500; therefore, a sensitivity control 501 is operated by a signal 525 to favor signals occurring during the predicted time. The sensitivity control increases the amplitude of the signals from the pulse multiplier 500 by a factor of approximately ten relative to noise whenever operated by a signal on line 525. Since it is also possible to predict that the desired pulses will have a relatively low frequency, a low pass filter 502 further prevents noise signals from reaching later circuits. The signal from the low pass filter 502 is amplified and all pulses and noise below a predetermined threshold level are rejected by an amplifier and threshold circuit 503. The signals developed from the desired pad edges are on the order of 50 microseconds in width, which is equivalent to about 0.0003 inch. To improve their resolution a peak discriminator 504 accurately locates the peaks of the pulses to about plus or minus 5 microseconds or plus or minus 30 millionth of an inch. The peak discriminator 504 generates sharp rise-time pulses at the signal peaks by detecting signal slope reversals. These pulses trigger a single shot generator or multivibrator 505 which generates constate width and amplitude pulses on line 506. These signals will not necessarily represent only the desired pad edges because, for example, the edge of the chip would also give rise to a pulse. It is therefore necessary to perform further selection operations.

Figure 5B:
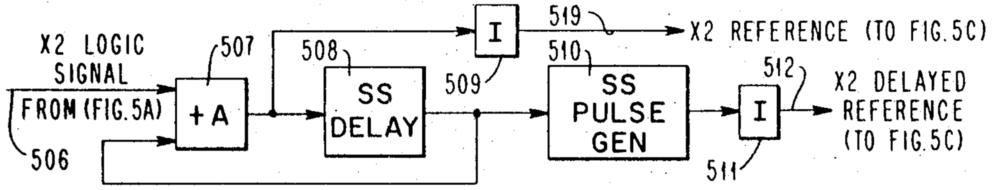
Figure 5C:
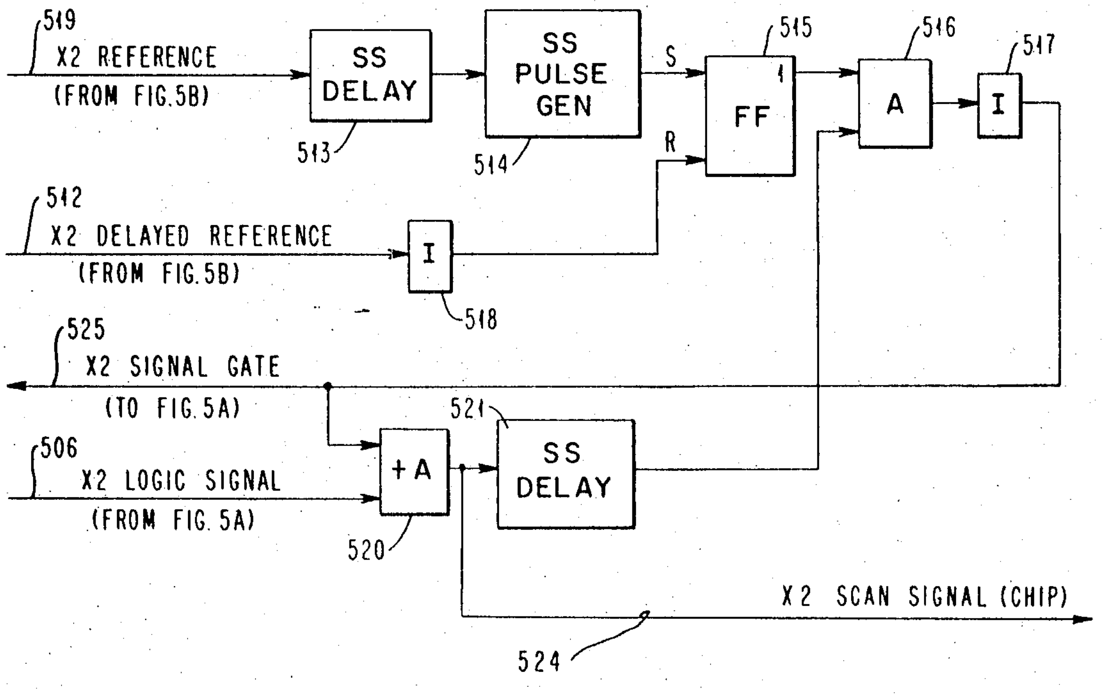

FIGS. 5B and 5C are shown using well known logic circuits operated by positive-rising signals to give a negative output.

Referring now to FIG. 5B, a reference signal generation circuit acts upon the signal on line 506 to provide a reference used to separate the desired pulses from the balance of the pulses. The first large pulse that occurs in a given scan on line 506 is designated a "reference" signal. The signal and noise pulses following this reference signal are thereafter excluded from the circuit 306. Also, a delayed reference signal is generated on line 512 for use as a reset pulse between scans. The first pulse on line 506 is applied to AND circuit 507 and is passed through the scan circuit to output line 519 via inverter 509 because the output of the single shot delay circuit is normally positive. After a given delay, for example 225 milliseconds, the output of the single shot delay circuit 508 becomes negative blocking operation of the AND circuit 507. Therefore, the pulse on line 506 will appear on line 519 with a constant maximum duration of 225 milliseconds. Operation of the single shot delay 508 will thereafter block further signals from passing through the AND circuit 507. For the duration of the operation of the single shot delay 508, no further pulses will appear on the line 519. When, after 225 milliseconds, the single shot delay circuit 508 is restored, the single shot pulse generator 510 creates a short pulse which is passed to line 512 via the inverter 511 as a reset signal.

Referring now to FIG. 5C, there is shown a block diagram of a circuit used for signal gate generation and signal gating. The reference signal on line 519 initiates a single shot delay in single shot delay circuit 513 which extends beyond the chip edges thus suppressing all noise signals during this period by putting a signal on line 525 to FIG. 5A. This signal is latched by a flip-flop 515 and normally passes through AND circuit 516. The detection of a leading edge signal triggers a single shot delay circuit 521 via the AND circuit 520 (which is held operated by the signal on line 525). The single shot delay 521 period extends to the position where the trailing edge signal would occur for a minimum width pad. All noise is suppressed during this period by holding the input to the AND circuit 516 operated keeping a signal on line 525 to the sensitivity control 501. Operation of the single shot 521 after its fixed delay, blocks the gate 516 and via, inverter 517, the AND gate 520. The resultant signal on line 525 is a signal encompassing the expected pulse positions of the leading and trailing edges of the pad. The actual signals appearing on 506 during this period are passed through the AND circuit 520 and appear on line 524 as a pair of signals corresponding, respectively, to the leading and trailing edges of the pad contact. (It should be noted here, that if the pulse selection logic circuit is used in connection with a scan of a substrate, only one signal will be generated corresponding to the cavity edge.)

Figure 5D:
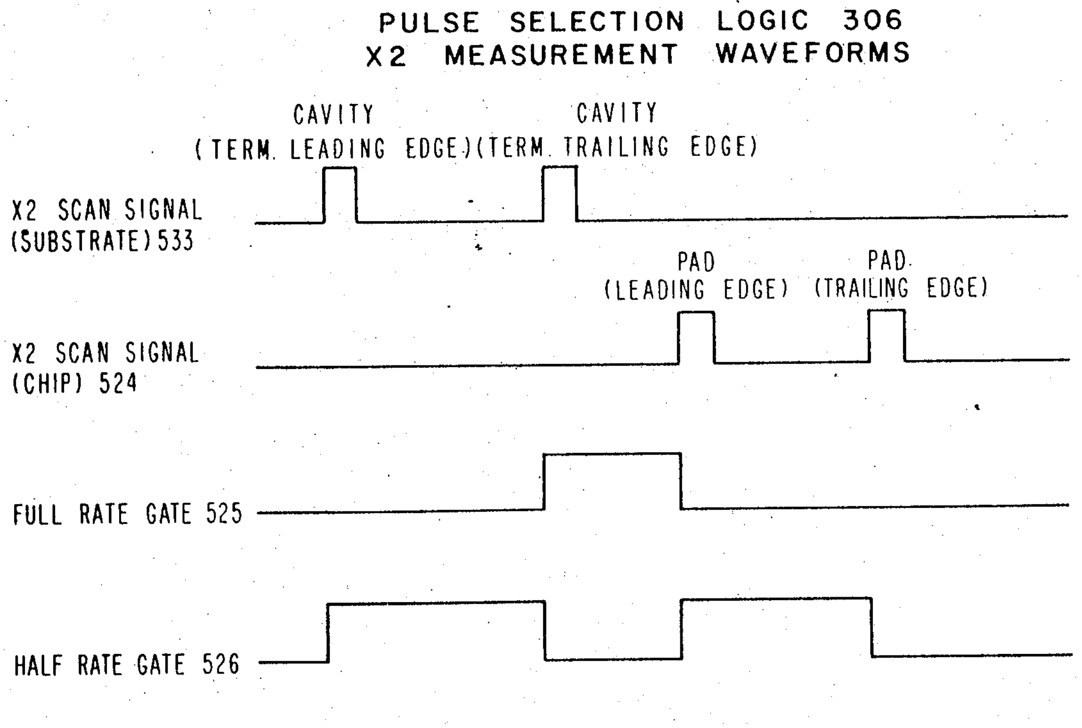
Figure 5E:
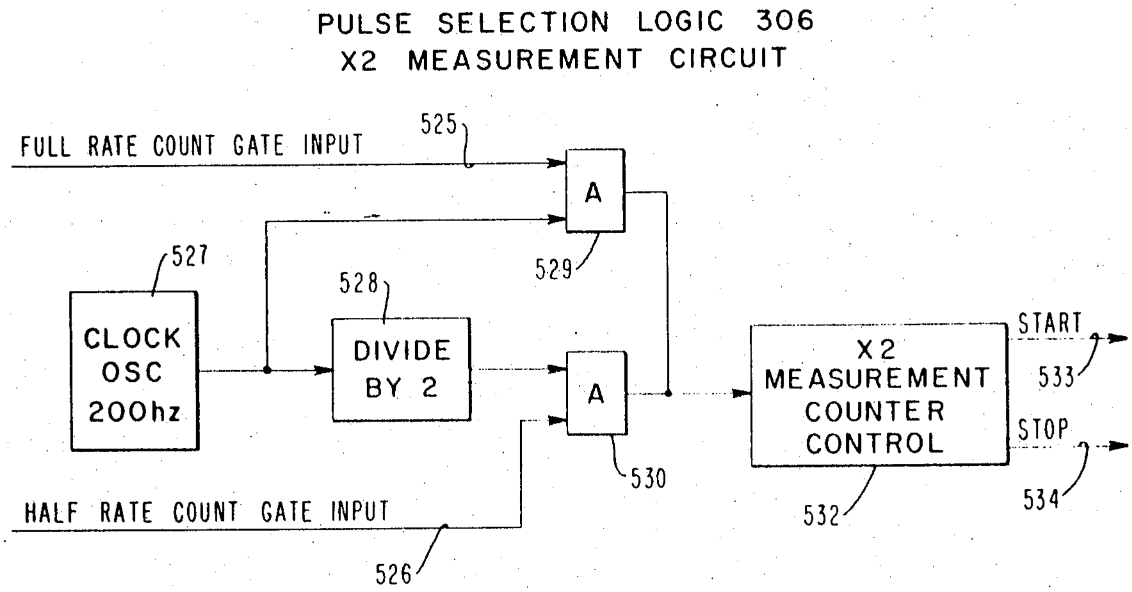

Referring now to FIGS. 5D and 5E, the operation of a measurement circuit is functionally shown. Since the signals on line 524 represent the leading and trailing edges of the pad, it is necessary to provide circuits for indicating the center line of the pad lying between the two signals on line 524. This is accomplished, as shown in FIG. 5D, by utilizing the leading edge and trailing edge pulses on line 524 as well as the corresponding substrate scan signal on line 533 representing the leading and trailing edges of the cavity terminal. Gates permit a counter to record an amount proportional to the distance from the cavity terminal center line to the pad center line as though the pad were superimposed upon the cavity. This can be accomplished by counting from leading edge to leading edge or trailing edge to trailing edge. In another version this is accomplished by starting a half rate gate signal (line 525) upon detection of the cavity terminal leading edge signal and terminating the half rate gate signal, in favor of a full rate gate signal (line 526) upon detection of the terminal trailing edge signal. The full rate gate signal continues until the leading edge pad signal is recognized whereupon the half rate signal is reinstituted by the period between the leading edge and trailing edeg of the chip pad signal. The counter should then contain an amount proportional to the distance from the cavity terminal center line to the center line of the pad halfway between the leading edge and the trailing edge of the pad. Referring to FIG. 5E, this is shown by providing a clock oscillator 527 operated at, for example 200 hertz. This 200 hertz signal is applied directly to an AND gate 529 and also to an AND gate 530 via a frequency divider 528. Thus, the AND gate 529 is a full rate gate passing a 200 hertz signal when operated by a signal on the line 525. The AND gate 530, on the other hand, will pass a 100 hertz signal when operated by a signal on the line 526. The signals on the lines 525 and 526 are generated in accordance with FIG. 5D, and are supplied to start and stop a counter by means of signals placed on start and stop on lines 533 and 534. The measurement counter control serves to start and stop the operation of a counter at a rate determined by the clock oscillator 527 in the manner just described. The accuracy of the system is greatly increased if the counter is permitted to accumulate information from several successive scans and the counter is operated at a rate inverse to the number of scans used. For example, if four scans are accumulated, the counter will be stepped at a "full" rate of 50 hertz and a "half" rate of 25 hertz.

(c) Measurement counter logic

The measurement counter logic 301 serves to step associated counters 312, 313 and 314 in accordance with signals on the start and stop lines from the pulse selection logic 300. The measurement counter logic 301 also incorporates substrate reference numbers received from lines 331, 332 and 333. Each substrate reference number indicates a quantity by which the associated counter must be increased prior to operation by the pulse selection logic 300 in order to provide a reference for each of the cavities of the substrate. For example, if the top left cavity is being scanned, the substrate reference number supplied may be zero; however, if the top right cavity is being scanned the substrate reference number for the X1 and X2 counters 312 and 313 must be increased by an amount equal to the distance between the cavity edges of the top left and top right cavities along the X axes.

(d) Counters and stores

The counters and stores are shown in block diagram form and are believed well known in the art. It is desirable that the counters 312, 313, 314 and 315 be binary counters, however, they may be decimal counters or any other form of counter capable of operation in two directions, that is capable of being counted up as well as down. Stores 317, 318 and 319 are provided to permit each corresponding counter to be used for successive operations without losing the contents of a previous operation. It is not necessary to provide a store for the X1 counter 312 because it is used only to supply a quantity needed to operate the $\theta$ counter 315 during each operation. The stores may be of any of the many well known types of registers comprising flip-flops or they may be composed of a series of locations in a single memory, such as a magnetic core memory. Alternatively, a core memory or other form of memory, such as a delay line memory, may be provided for holding all information associated with the counting operation. The stores must at least be capable of holding sufficient counts for keeping track of the dimensions sensed for the chips because, in the preferred embodiment, four chips are scanned before a substrate and chip are brought to a placement station for alignment. The $\theta$ counter 315 is operated by $\theta$ logic 316 which performs operations representated by the equation previously described with reference to the cross-referenced Brunner and Weber application.

(e) Stepping logic

The stepping logic 302 controls the position of the stepping motors and initializes their positions prior to operation by the counters. The stepping logic 320, 321 and 322 is operative to place signals on lines 324, 325 and 326 to the corresponding stepping motors under control of "home" and "correct" signals. When a signal appears on the "home" line of a stepping logic, the corresponding stepping motor is placed in an initial position. Thereafter, the appearance of a signal on the "correct" line readies the stepping logic for operation of a stepping motor to a new position relative to the "home" position. This new position is determined by the contents of the counter associated with the stepping logic. The counter is stepped down to zero causing a number of signals to appear at the input 334, 335 and 336 of the stepping logic corresponding to the contents of the associated counter. The stepping logic transfers these pulses to the stepping motor to move it a number of steps corresponding to the amount stored in the associated counter. For example, in the case of the X2 axis, the stepping motor will be placed in a "correct" position corresponding to the distance between the cavity terminal edges and the pad center line along the X2 axis. While a counter, for example 313, is thus stepped down to zero by the stepping logic 321, the information that was in the counter was also retained in the store 317 and is available for future use if necessary. Counts corresponding to subsequent chips are also retained in the store 317 and will be placed in the counter 313 to operate the associated X2 stepping motor when needed.

Figure 6A:
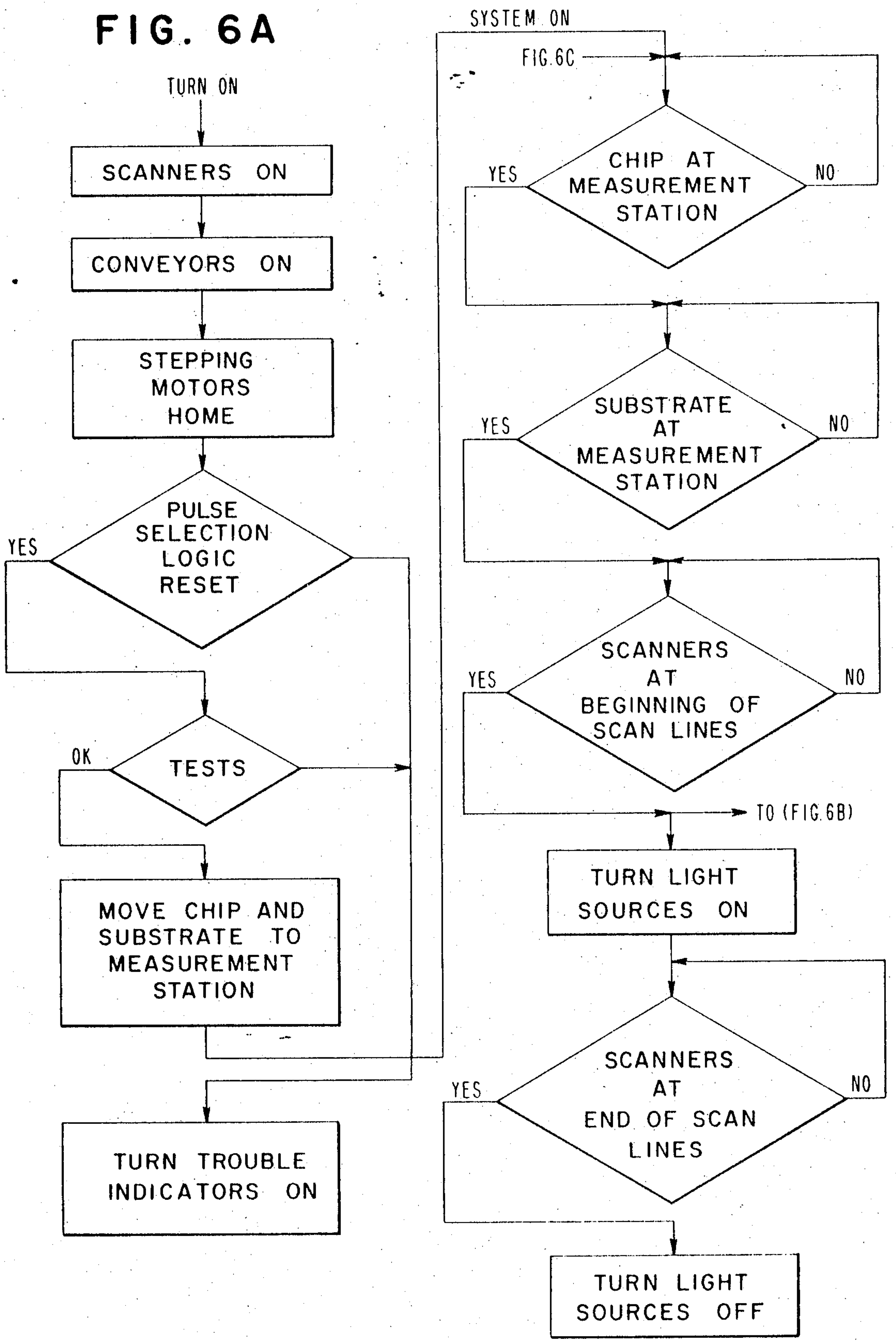
FIGS. 6A through 6C are flow diagrams illustrating the operation of the preferred embodiment shown in FIG. 1.
Figure 6B:
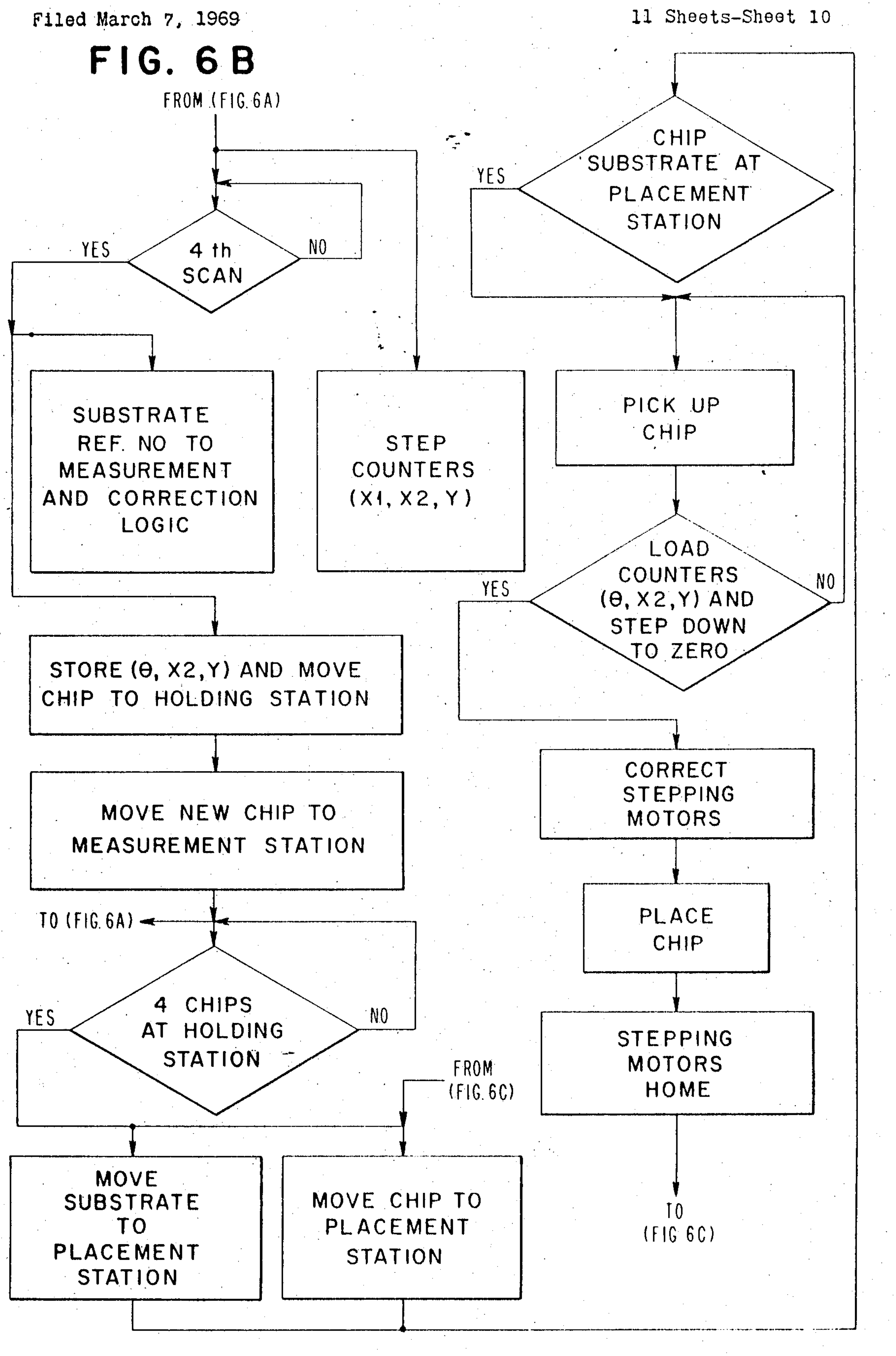
Figure 6C:
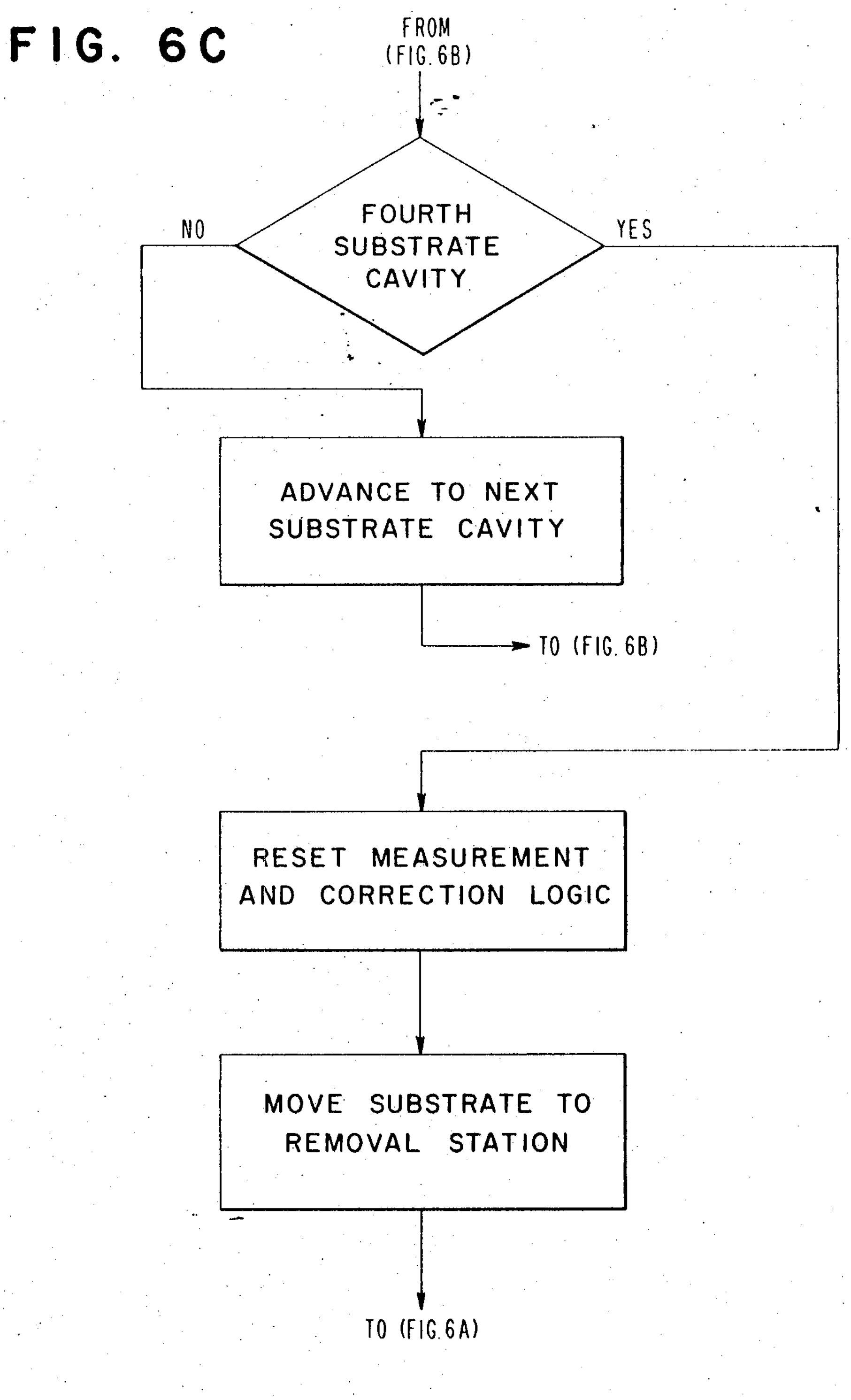

(5) Detailed operation (FIGS. 6A–6C)

The operation of the preferred embodiment shown in the figures will now be explained with reference to the flow diagram of FIGS. 6A through 6C. The operation will be described mentioning parts shown in essentially all figures of the drawings. The figures will not be identified because the part numbers will indicate the applicable figures. For example, all parts in FIG. 1 are preceded by the numeral 1, that is, they range from 100 through 199. Similarly the part numbers to FIGS. 2A through 2D range from 200 through 299.

The system is turned "on" by supplying electrical power to the optical measurement assembly 199, the conveyor systems 196 and 197 and the chip correction and placement table 198. The electronic circuits, such as the measurement and correction logic 119 and the associated stepping motors are simultaneously powered. A first cavity of the substrate is selected and identified by appropriate signals supplied on lines 331, 332 and 333, and the stepping motors are placed in their "home" position by appropriate signals on lines 324, 325 and 326 under control of the stepping logic 302. If the pulse selection logic 300 is reset, particularly referring to the pulse selection logic 306, flip-flops 515, 522 and 523, a number of tests are performed. For example, to assure that a chip is not positioned erroneously, the signals which occur during scanning are monitored with respect to several parameters. A low amplitude detector triggers reject logic when pulses occur which are too low to be discriminated reliably. A wide pulse detector signals reject logic if a pulse occurs which is too wide for accurate discrimination. The number of pulses per scan is also monitored, two pad signal pulses being allowed per scan. Other tests are also performed, it being assumed that all tests result in "OK." If any of the tests are positive, trouble indicators are turned on and the system may, or may not, as desired, be turned off and operation suspended. Assuming the tests are all negative, a first chip 100 on a carrier 101 is moved to the chip measurement station and a first substrate 103 is moved to the substrate measurement station starting with cavity 102.

The system remains in a "hold" condition until the chip 100 is sensed at the chip measurement station and the cavity 102 of the substrate 103 is sensed at the substrate measurement station. The Y scanners and X scanners are operating, that is, the illumination 131 and 132 is ready and the shafts 112 and 127 are operating. Sensing circuitry, not shown, indicates that the shafts 112 and 127 are at a position corresponding to the beginning of a scan line. When this occurs, the light sources 131 and 132 are turned on until the shafts 112 and 127 are sensed to be at the end of a scan line, at which time the light sources 131 and 132 are turned off. A scan line is defined as the distance along a scan axis necessary to scan the cavity edges and desired pads as shown in FIG. 4A.

The Y scanners and X scanners will repeat their operation for four successive scans, the photocells supplying signals to the measurement and correction logic 119 during this time. Signals from the cavity 102 will be supplied to the pulse selection logic 303, 305 and 307 and signals regarding the pad edges of the chip 100 will be supplied to the pulse selection logic 304, 306 and 308 for selection of desired signals. The counters 312, 313 and 314 will be initially set to the substrate reference number for the particular cavity 102 and will be increased by the amount of the misalignment as detected by the pulse selection logic 300. While the X1 counter 312, X2 counter 313 and Y counter 314 will be stepped for four successive scans, the stepping is at one fourth the rate necessary to provide a number in the counters proportional to the dimensioned scanned. Therefore upon completion of the four scans each of the counters will contain a number proportional to the dimension along its scanned axis. After the fourth scan, the contents of the X2 counter 313 is stored in the X2 store 317 and the contents of the Y counter 314 is placed in the Y store 318. The contents of the counters 312 and 313 are used to step the $\theta$ counter 315 in accordance with the $\theta$ logic 316 and the contents of the $\theta$ counter 315 are then placed in the $\theta$ store 319.

The chip 100 is moved on its carrier 101 to the chip holding station via the belt 135 and a new chip is moved to the chip measurement station on the belt 158. The masks 113, 116, 124 and 128 are adjusted to permit scanning of a second cavity of the substrate 103 and a corresponding substrate reference number is supplied on lines 331, 332 and 333 to preset the counters 312, 313 and 314. The new chip at the chip measurement station and the new cavity at the substrate measurement station are scanned in the same manner as the chip 100 in cavity 102 and the counters 312, 313 and 314 are operated in the manner previously described. After the fourth scan of the chip and cavity now at the chip measurement station and the substrate measurement station, the contents of the counters 312, 313 and 314 are used to store quantities in the stores 317, 318 and 319 and are indicative of the misalignment of this second chip with reference to this second cavity.

A third chip is brought to the chip measurement station and a third cavity of the substrate 103 is selected, by appropriate movement of the masks 113, 118, 124 and 128 and appropriate substrate reference number signals on lines 331, 332 and 333. Again, the scanning operation is repeated and after the fourth scan the counter contents are placed into the appropriate stores. This operation is repeated for a fourth chip and a fourth cavity of the substrate 103. In each case the current chip is moved on its carrier via the belt 135 to the chip holding station. After the fourth chip has been scanned and moved to the chip holding station and the fourth cavity has been scanned, sensing circuits, not shown, will indicate that there are four chips at the holding station.

At this time, the substrate 103 is moved to the placement station and the first chip 100 on its carrier 101 is removed from the chip holding station, by operation of the solenoid 137, and brought on the belt 138 to the placement station. When sensing circuits, not shown, detect that a chip on its carrier is at the placement station of the conveyor system 197 and a substrate is at the placement station of the conveyor station 196, the stepping logic 302 is operated by supplying a "correct" signal to the stepping logic 320, 321 and 322. The chip 100 is held by the probe 145 under vacuum supplied by a hose 147, the carrier 101 is moved by belt 155 due to retraction of the slot 177 by the solenoid 163 and the pushing action of solenoid 162, to the chip carrier removal station. The table 148 is adjusted by screws 152, 153 and 154 in accordance with signals supplied to the stepping motors on lines 324, 325 and 326 after the counters 313, 314 and 315 are loaded from the stores 317, 318 and 319 with numbers corresponding to the respective scans of the first chip and first cavity. The stepping logic will then cause the counters to be stepped to zero and passes the results of this stepping on lines 324, 325 and 326 to the stepping motors. The chip is then lowered through the aperture 144 and placed into the cavity 102. The probe vacuum is removed and the probe is lifted leaving the chip in the cavity in its properly aligned and prebonded position. The stepping motors are returned to their home position in accordance with a "home" signal applied to the stepping logic 320, 321 and 322.

The next substrate cavity is to be filled. This is accomplishing by bringing the second chip on its carrier from the chip holding station by operating the solenoid 137. When the second chip is at the placement station of the conveyor system 197, the probe 145 lifts the chip off its carrier and the carrier is moved to the chip carrier removal station. The counters 313, 314 and 315 are loaded from the corresponding stores 317, 318 and 319 with an amount representative of the scanning of the second chip and the second cavity. The counters are then stepped down to zero and the stepping motors are corrected to move the chip with respect to the second cavity an amount necessary to properly align it as indicated by the quantities in the counters. The chip is placed as previously described, the probe 145 is withdrawn leaving the chip in the second cavity and the motors are stepped home. This is repeated a third time for the third chip and the third cavity and a fourth time for the fourth chip and the fourth cavity. When the fourth substrate cavity is filled with the fourth chip, the measurement and correction logic 119 is completely reset and the substrate 103 is moved from the placement station of the substrate conveyor 196 to the substrate removal station by operation of the solenoid 170. The cavities of the substrate 103 will thus have been filled with four chips, and loading of chips into another substrate may now begin, as previously described.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an automatic integrated circuit manufacturing system, a subassembly for accurately positioning solid-state chips having peripheral conductive pads in retaining cavities of insulating substrates having conductive points preparatory to bonding the chips into the substrate and interconnecting the chip pads and substrate points, comprising:

a chip measurement station at a first predetermined spacial coordinate, for holding at least one chip at a time;

a substrate measurement station at a second predetermined spacial coordinate, for holding at least one substrate at a time;

a placement station, at a third predetermined spacial coordinate, for holding at least one chip and one substrate at a time;

transfer apparatus, connecting the chip measurement station, substrate measurement station and placement station, for conveying chips and substrates from their respective stations to the placement station;

light sources, at the chip measurement station and substrate measurement station, for illuminating the surfaces of at least one of the chips and one of the substrates held at the measurement stations;

electro-optical measurement means, at each measurement station, for optically scanning the illuminated chip and a caivty of the illuminated substrate, held at the associated station, in two X-axes and one Y-axis and supplying at an output electrical pulses representative of the optically scanned chip and substrate points;

pulse selection logic, connected to the electro-optical measurement means output, for selecting those electrical pulses representative of the substrate cavity conductive point center lines and chip pad center lines, and presenting the selected pulses at an output;

measurement counter logic, connected to the pulse selection logic output, operative by the selected pulses to record one count for each optically scanned axis, two of said counts representing the difference between the cavity conductive point center lines and the corresponding chip pad center lines scanned along one X-axis and the Y-axis by the electro-optical measurement means, and the third count representing an angular correction factor determined as a function of the differences between the cavity conductive point center lines and corresponding chip pad center lines scanned along the two X-axes;

stepping logic connected to the measurement counter logic and operable in accordance with the counts recorded therein, to generate at an output positioning signals including a set of "homing" signals and a set of "correcting" signals; and stepping motors at the placement station connected to the stepping logic output and operated from a "home" position by the output positioning signals therefrom, for "correcting" the position of the chip held at the placement station relative to one of the cavities of the substrate held at the placement station to equalize the differences between the cavity conductive point center lines and pad center lines, along each of the scanned axes.

2. In an automatic integrated circuit manufacturing system for accurately aligning a plurality of circuit parts with respect to each other, the combination comprising:

first, second and third stations at first, second and third predetermined spacial coordinates;

light sources, at the first and second stations for illuminating the surfaces of first and second parts each held at one of the stations;

measurement means, at each of said first and second stations, for optically scanning the part, held at the associated station, in a plurality of axes and supplying at an output electrical pulses representative of the optically scanned points;

logic means, connected to the measurement means output, for selecting those electrical pulses representative of predefined points on said parts, recording a plurality of counts as a function of said selected pulses and generating at an output positioning signals in accordance with said counts;

transfer apparatus, connecting the first and second stations to the third station, for conveying first and second parts from the first and second stations to the third station; and means at the third station connected to the logic means output and operated by the output positioning signals therefrom, for adjusting the position of one of the parts held at the third station relative to the other part held at that station to align the predefined points on said parts.

3. The system of claim 2 further comprising supporting means, coextensive with said second and third stations and simultaneously holding circuit parts at each of said stations, for adjusting the position of the point at the second station in synchronism with the adjustment of the part at the third station.

4. In a positioning system for aligning two parts with respect to a "floating" reference, comprising:

a plurality of measurement means, for scanning both the parts to be aligned, each in a plurality of axes and supplying at an output electrical pulses representative of predetermined points along each axis scanned;

logic means, connected to the measurement means output, for generating at an output signals indicative of the adjustment amount along each scanned axis necessary to align the parts; and positioning means, one for each scanned axis, connected to the logic means output and responsive to the signals therefrom to adjust one of the parts with respect to the other by the amount necessary for alignment.

5. The system of claim 4 wherein the logic means output signals indicative of the adjustment amount are determined by the differences between the electrical pulses from the measurement means representative of predetermined points along each of a number of axes scanned on one part and the pulses representative of the points along the corresponding axes of the other part.

6. In an automatic integrated circuit manufacturing process, the steps for accurately positioning solid-state chips, having peripheral conductive pads, in retaining cavities of insulating substrates, having conductive points, preparatory to bonding the chips into the substrate and interconnecting the chip pads and substrate points, comprising:

holding one chip at a time at a chip measurement station;

holding one substrate at a time at a substrate measurement station;

illuminating the surfaces of the chip and the substrate held at the measurement stations;

optically scanning the chip and a cavity of the substrate, held at each station, in two X-axes and one Y-axis;

selecting scanning indicia which represent substrate cavity conductive points and chip pad center lines;

noting the amounts of the differences between the cavity conductive points and the corresponding chip pad center lines along each scanned axis; and adjusting the relative position of the chip and the substrate in accordance with the noted amounts thus aligning corresponding pads and points.

7. In an automatic integrated circuit manufacturing process, the steps for accurately positioning solid-state chips, having peripheral conductive pads, in retaining cavities of insulating substrates, having corresponding conductive points or terminals, preparatory to bonding the chips into the substrate and interconnecting the chip pads and substrate points, comprising:

holding one chip at a time at a chip measurement station;

holding one substrate at a time at a substrate measurement station;

illuminating the surfaces of the chip and the substrate held at the measurement stations;

optically scanning the chip and a cavity of the substrate, held at each station, in two X-axes and one Y-axis;

selecting scanning indicia which represent substrate cavity conductive points or terminal center lines and chip pad center lines;

recording one count for each optically scanned axis, two of said counts representing the difference between the cavity conductive points and terminal center lines and the corresponding chip pad center lines scanned along one X-axis and the Y-axis by the electro-optical measurement means, and the third count representing an angular correction factor determined as a function of the differences between the cavity conductive points or terminal center lines and corresponding chip pad center lines scanned along the two X-axes;

conveying chips and substrates from their respective stations to a placement station;

holding one chip and one substrate at a time at the placement station; and adjusting the relative position of the chip held at the placement station and one of the cavities of the substrate held at the placement station the noted amount thus equalizing the differences between the cavity conductive points or terminal center lines and pad center lines, along each of the scanned axes.

References Cited

UNITED STATES PATENTS

| | | | |
|---|---|---|---|
| 3,337,941 | 8/1967 | Drop | 29—407X |
| 3,344,900 | 10/1967 | Drop | 29—203 |

THOMAS H. EAGER, Primary Examiner

U.S. Cl. X.R.

29—203, 625